United States Patent [19]

Buma

[11] Patent Number: 4,613,116
[45] Date of Patent: Sep. 23, 1986

[54] AIR SUSPENSION

[75] Inventor: Shuuichi Buma, Aichi, Japan

[73] Assignee: Toyota Jidosha Kabushiki Kaisha, Japan

[21] Appl. No.: 675,847

[22] Filed: Nov. 28, 1984

[51] Int. Cl.[4] .............................................. F16F 13/00
[52] U.S. Cl. ................................. 267/64.25; 280/714
[58] Field of Search ................... 267/35, 64.24, 64.25; 280/707, 708, 709, 710, 711, 712, 714

[56] References Cited

U.S. PATENT DOCUMENTS

| | | | |
|---|---|---|---|
| 2,622,872 | 12/1952 | Wettstein | 267/64.25 X |
| 4,154,461 | 5/1979 | Schnittger | 280/714 X |
| 4,313,529 | 2/1982 | Kato et al. | 280/714 X |
| 4,534,580 | 8/1985 | Kobayashi et al. | 267/64.25 X |

FOREIGN PATENT DOCUMENTS

| | | |
|---|---|---|
| 0080291 | 6/1983 | European Pat. Off. |
| 158737 | 5/1940 | Fed. Rep. of Germany . |
| 1833883 | 6/1961 | Fed. Rep. of Germany . |
| 3233160 | 3/1984 | Fed. Rep. of Germany . |
| 3403649 | 8/1984 | Fed. Rep. of Germany . |
| 3403648 | 8/1984 | Fed. Rep. of Germany . |
| 2206204 | 6/1974 | France . |
| 2270112 | 12/1975 | France . |
| 2362017 | 3/1978 | France . |
| 59-6106 | 1/1984 | Japan . |
| 59-75813 | 4/1984 | Japan . |
| 2060814 | 5/1981 | United Kingdom . |
| 2135020 | 8/1984 | United Kingdom . |
| 2134625 | 8/1984 | United Kingdom . |

Primary Examiner—Duane A. Reger
Attorney, Agent, or Firm—Kane, Dalsimer, Kane, Sullivan and Kurucz

[57] ABSTRACT

An air suspension comprises a shock absorber, first and second air chambers surrounding the shock absorber, a valve for affording and shutting off communication between the first and second air chambers and an electric motor for operating the valve. The first and second air chambers are constituted such that they act as parallel springs or series springs when both air chambers shut off to each other.

7 Claims, 4 Drawing Figures

AIR SUSPENSION

BACKGROUND OF THE INVENTION

1. Field of the Invention

This invention relates to an air suspension, and more particularly to a suspension having an air spring added to a shock absorber.

2. Description of the Prior Art

A strut type air suspension comprises a shock absorber and an air spring. The air spring is constituted such that a housing is mounted on a piston rod of the shock absorber while a diaphragm is spanned between the housing and a cylinder of the shock absorber to fill an air chamber surrounded by the housing and diaphragm with compressed air. In this air spring can be adjusted a vehicle height by changing the volume of the air chamber.

Thus, in the prior air suspension, when the vehicle height is determined to a predetermined one, a spring constant could not be adjusted by changing the volume of the air chamber since the volume of the air chamber becomes constant.

Next, while not related directly to the adjustment of the spring constant, when the diaphragm is broken, air in the air chamber is exhausted so that the vehicle height may be abruptly reduced to damage the controllability.

SUMMARY OF THE INVENTION

Accordingly, an object of the present invention is to provide an air suspension in which the spring constant can be adjusted in a predetermined vehicle height.

A further object of the present invention is to provide an air suspension in which the vehicle height can be prevented from abrupt reduction when the diaphragm is broken.

According to the present invention is provided the air suspension comprising first and second air chambers formed to surround a shock absorber, a valve capable of affording and shutting off communication between the first and second air chambers and a means for operating the valve.

The other objects and features of the present invention will become apparent from the following description of preferred embodiments of the invention with reference to the accmpanying drawings.

DESCRIPTION OF THE PREFERRED EMBODIMENTS

Figure 1:
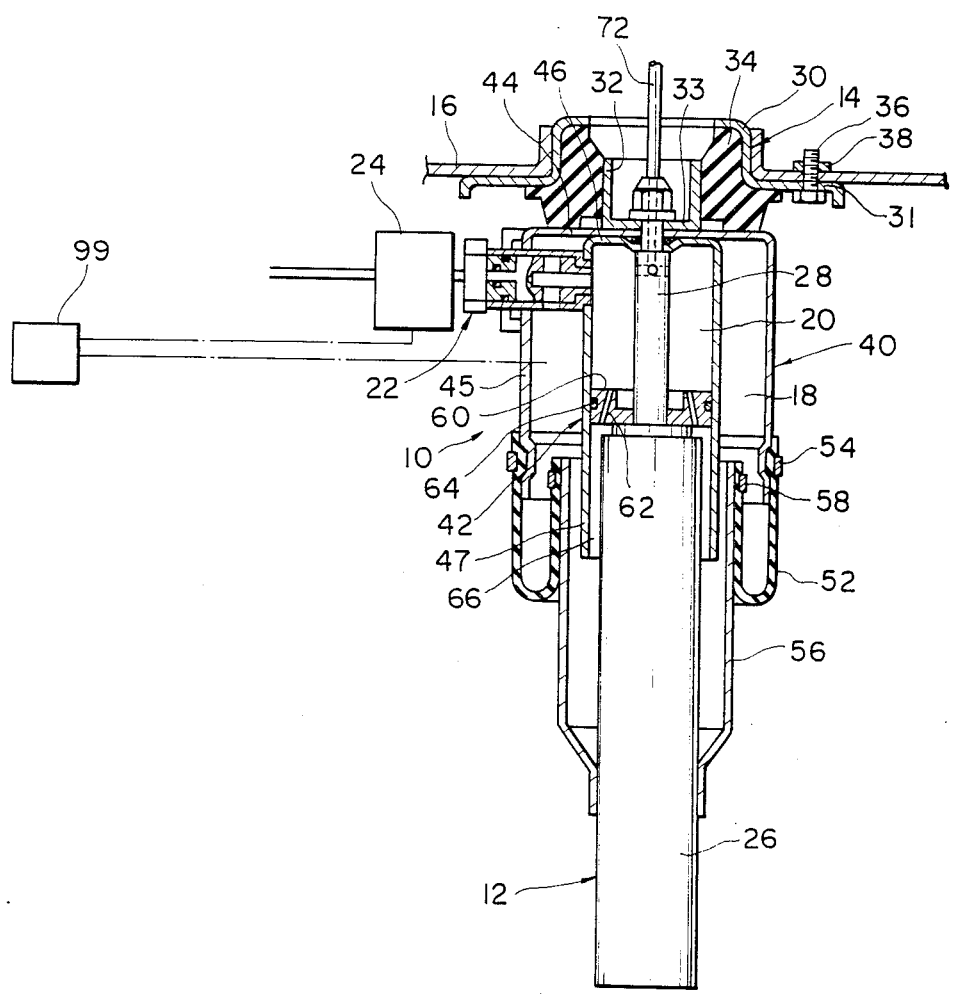
FIG. 1 is a sectional view showing an essential part of a suspension according to the present invention.

An air suspension 10 connecting the upper end of a shock absorber 12 to a car body 16 through a support 14 as shown in FIG. 1 comprises first and second air chambers 18 and 20.

The shock absorber 12 is provided with a cylinder 26, a piston disposed movably within the cylinder 26 and a piston rod 28 connected to the piston and projecting to the outside from the cylinder 26. The piston is provided with a valve through which oil or other liquid received in the cylinder flows when the piston rod 28 is extended and contracted. Since said constitution is known per se, the drawing showing the detail is omitted. The shock absorber 12 may be a so-called mono tube type one consisting of only a single cylinder as well as a so-called twin tube one provided with the inside shell and outside cylinder.

The support 14 is provided with an outer tube 30 having a flange 31, an inner tube 32 having a flange 33 and an elastic body 34 vulcanized and bonded to both tubes. A nut 38 is screwed onto a bolt 36 extending through the flange 31 of the outer tube 30 and the car body 16 to fix the upper support 14 to the car body 16.

Figure 2:
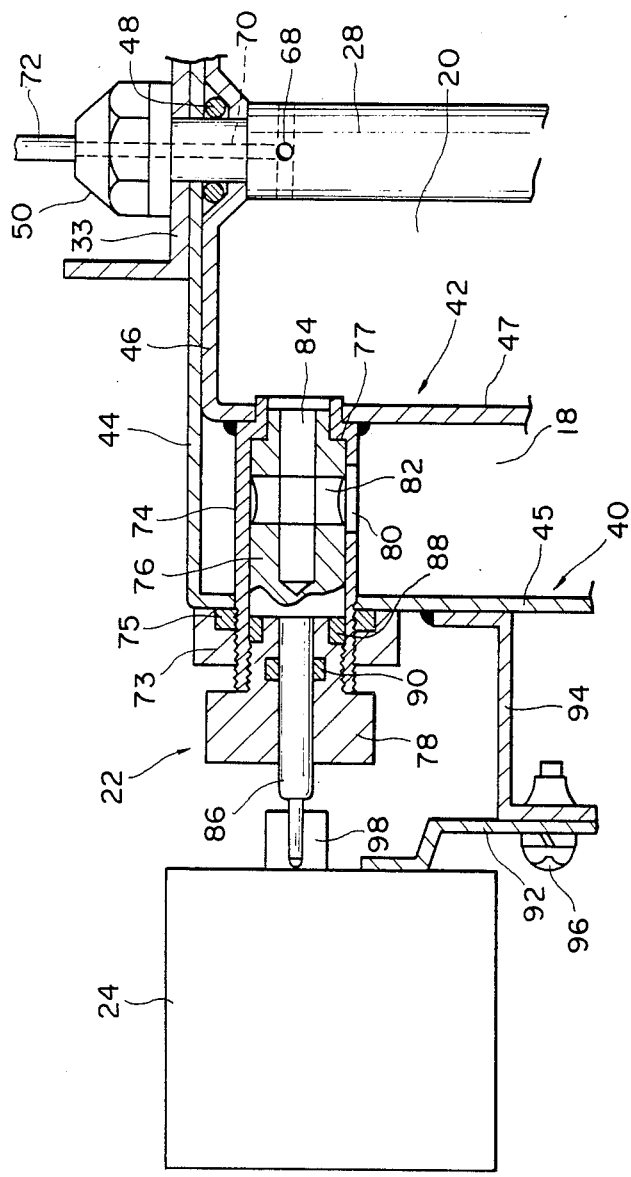
FIG. 2 is an enlarged scale sectional view showing a valve in FIG. 1.

First and second housings 40 and 42 are fixed to the piston rod 28. The first housing 40 has a round ceiling portion 44 and a cylindrical portion 45 connected integrally to the ceiling portion 44. The second housing 42 has a round ceiling portion 46 and a cylindrical portion 47 connected integrally to the ceiling portion 46. The ceiling portions 44 and 46 of both housings overlap each other while an O-ring 48 is interposed between both ceiling portions as shown in FIG. 2. The piston rod 28 extends through both housings and the flange 33 of the inner tube of the upper support 14 bearing against the upper side of the ceiling portion 44 of the first housing 40. A box nut 50 is screwed onto the piston rod 28 so that the first and second housings 40 and 42 are fixed to the piston rod 28.

An elastic member 52 is a diaphragm formed cylindrically of rubber. This elastic member 52 is folded back at the approximately central portion, the outside end thereof being sandwitched between the cylindrical portion 45 of the first housing 40 and a ring 54 and secured fixedly to the first housing 40 by caulking the ring 54. The inside end of the elastic member 52 bears against a cylindrical member 56 welded to the cylinder 26 and is secured fixedly to the cylindrical member 56 by caulking a ring 58. As a result, the first air chamber 18 is formed in cooperation with the elastic member 52 and first housing 40.

By providing the cylindrical member 56, the capacity of the first air chamber 18 can be increased, and the elastic member 52 can be prevented from the direct contact with the outer peripheral surface of the cylinder 26 to reduce the degradation of the member 52 due to heat. The cylindrical member 56, however, may be omitted. In this case the inside end of the elastic member 52 is fixed directly to the cylinder 26. The elastic member 52 may be a bellows.

The cylinder 26 of the shock absorber 12 is provided to the upper end with a fixed piston 60 which has an orifice 62 acting to throttle air flow and an O-ring 64 attached to the outer periphery thereof. The piston rod 28 extends movably through the fixed piston 60, while a cylindrical portion 47 of the second housing 42 fits movably on said fixed piston 60 under the air-tight condition. As a result, the second air chamber 20 is formed in cooperation with the fixed piston 60 and second housing 42. The second housing 42 advances into the cylindrical member 56. The orifice 62 opens to a space 66 between the second housing 42 and cylinder 26 so that the second air chamber 20 communicates to the space 66.

By providing the orifice 62 in said fixed piston 60, the dynamic spring constant can be varied according to the size of the orifice diameter so that it can be easily changed according to the specification between the same car families.

The piston rod 28 is provided with a radial hole 68 and an axial hole 70 communicating to the hole 68 as shown in FIG. 2. A hose 72 connected to the piston rod 28 by the box nut 50 communicates to the air chamber 20 through the holes 70 and 68 at one end thereof, and is connected to an air supply (not shown) at the other end thereof.

A valve 22 includes a casing 74, a valve body 76 and a plug nut 78 as shown in detail in FIG. 2.

The casing 74 formed of a cylinder extends through the cylindrical portion 45 of the first housing 40 to the cylindrical portion 47 of the second housing 42, the inside end thereof having the diameter reduced being fitted in the cylindrical portion 47. The casing 74 is secured fixedly to the second housing 42 by welding the outer periphery of the casing 74. The casing 74 has a hole 80 open to the first air chamber 18 and is secured fixedly to the first housing 40 by a nut 73 screwed onto the outer periphery thereof so that a gap between the casing 74 and the first housing 40 is kept air tight by an O-ring 75.

A valve body 76 has a radial hole 82 and an axial hole 84, and is inserted into the casing 74. When an inner shoulder 77 of the valve body abuts against the reduced diameter portion of the casing 74, the hole 82 is aligned with the hole 80 in the casing 74. When the hole 82 is in the position shown in FIG. 2, the first air chamber 18 communicates to the second air chamber 20 through the hole 80 in the casing 74 and the holes 82 and 84 in the valve body 76. When the valve body 76 is rotated 90°, however, the hole 80 in the casing 74 is completely put out of the alignment relationship with the hole 82 in the valve body 76 so that the first air chamber 18 is shut off from the second air chamber 20.

The plug nut 78 is screwed into the casing 74 and has an valve rod 86 of the valve body 76 extended therethrough. O-rings 88 and 90 are disposed respectively between the plug nut 78 and the casing 74 and between the plug nut 78 and the valve rod 86 to keep the gap air-tight.

A means for operating the valve 22 is an electric motor in the embodiment shown. The operating means 24 is provided with an attachment 92 which abuts againt a bracket 94 fixed to the cylindrical portion 45 of the first housing, and to the first houding 40 by tightening a screw 96. The flat end of the valve rod 86 of the valve body 76 is inserted into a slit provided in a shaft 98 of the operating means 24.

A pressure detecting means 99 is connected to the first air chamber 18 (FIG. 1), and generates a signal when the elastic member 52 is broken and pressure in the first air chamber 18 is reduced.

Figure 3:
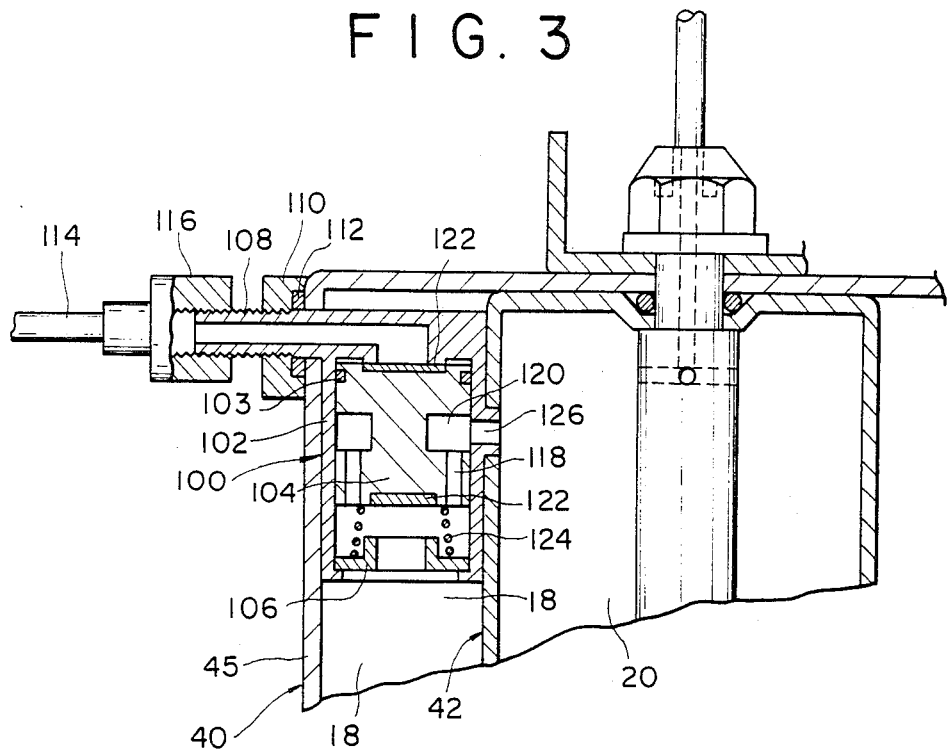
FIG. 3 is a sectional view showing another embodiment of the valve.

In an embodiment shown in FIG. 3, a valve 100 is provided with a casing 102, a valve body 104 and a valve seat 106. The casing 102 is formed cylindrically and arranged between the first and second housings 40 and 42, the connection 108 thereof projecting to the outside through the cylindrical portion 45 of the first housing 40. A nut 110 is screwed onto the connection 108 so that the gap between the connection 108 and the first housing 40 is kept air-tight by an O-ring 112 supported with this nut 110. Onto the connection 108 is screwed a pipe connector 116 connected to a hose 114 which is connected to an air supply or pump to be supplied with compressed air or pressurized liquid. In the shown embodiment, the valve 100 is operated by the compressed air or pressurized liquid.

The valve body 104 is an axially slidable spool inside the casing 102 and provided with holes 118 extending axially from the lower end face and a circumferential groove 120 communicating to the holes 118. Seal members 122 are mounted on the upper and lower end faces of the valve body 104. The valve body 104 is inserted into the casing 102 and a spring 124 is put against the underside of the valve 104. The valve seat 106 is disposed at the opening end of the casing 102, and secured fixedly to the casing 102 by caulking the casing 102 so that the valve body 104 is received in the casing 102. The valve body 104 and casing 102 are sealed by an O-ring 103. The valve body 104 is biased upward by the spring 124 so that the upper seal member 122 bears against the casing 102. Then, the groove 120 on the valve body 104 communicates to a hole 126 provided in the casing 102 and open to the second air chamber 20.

When compressed air or pressurized liquid is supplied to the connection 108, the valve body 104 moves downward against the force of the spring 124 and the lower seal member 122 abuts against the valve seat 106 to shut off communication between the groove 120 and the hole 126. That is, to shut off the valve 100, such a large pressure should be introduced to the connection 108 that the force of pressure acting on the valve body 104 from fluid introduced to the connection 108 exceeds the total forces acting on the valve body 104 through the spring force of the spring 124 and the force of pressure in the first air chamber 18.

On the other hand, to the connection 108 are always applied pressure adjusted such that the force caused by the pressure in the connection and acting on the valve body 104 exceeds slightly the spring force of the spring 124, but is lower than the total of the spring force and the force caused by pressure in the first air chamber 18. Then, when the force given by the pressure in the first air chamber 18 is substantially lost, i.e., the diaphragm 52 is broken, the valve body 104 is depressed down by the pressure of fluid to shut off communication between the first and second air chambers 18 and 20. By this operation can be dispensed with the pressure detecting means 99.

The other constitution in the embodiment shown in Fig. 3 is similar to that shown in FIG. 1.

Figure 4:
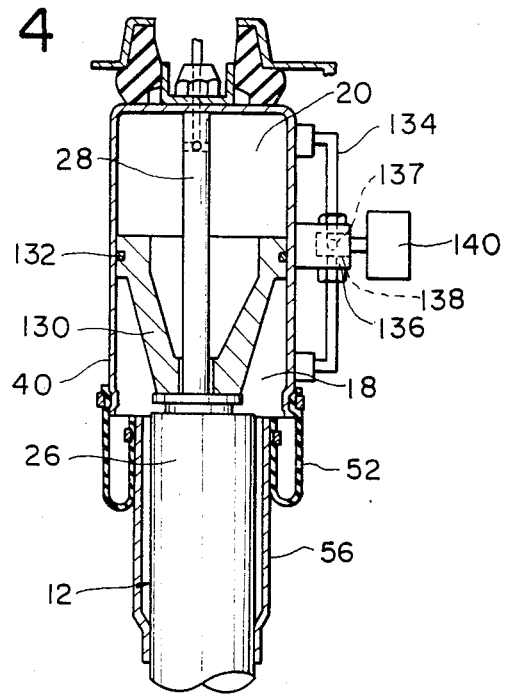
FIG. 4 is a sectional view showing an essential part of a further embodiment of the suspension.

FIG. 4 shows another embodiment in which only first housing 40 is fixed to the piston rod 28 of the shock absorber 12 and the elastic members 52 are secured fixedly to the cylindrical member 56 and the housing 40, respectively. A conically formed fixed piston 130 is mounted on the cylinder 26 of the shock absorber 12. This fixed piston 130 has the piston rod 28 movably extended therethrough while having the first housing 40 movably fitted thereon to keep the outer periphery air-tight with an O-ring 132 attached thereto. As a result, the first air chamber 18 is formed of the first housing 40, the elastic member 52 and the fixed piston 130, and the second air chamber 20 formed of the first housing 40 and the fixed piston 130.

A pipe 134 open respectively to the lower position of the first air chamber 18 and the upper position of the second air chamber 20 is attached to the housing 40. A valve 136 incorporated in this pipe 134 is provided with a valve body 138 having a hole 137 opened radially. When the valve body 138 is rotated 90° by a motor 140, the valve 136 is changed over from the shut-off condition to the communicating one to afford communication between the first and second air chambers.

Operation of Embodiment (1) When spring constant is changed:

The valve 22 is operated by the operating means 24 to afford communication between the first and second air chambers 18 and 20. Under such a condition, when compressed air is supplied through the hose 72, the compressed air is filled in the first and second air chambers 18 and 20 so that the filling amount is adjusted to determine the vehicle height as desired.

When an automobile starts suddenly, stops abruptly or turns, the valve 22 is operated by the operating means 24 to shut off communication between the first and second air chambers 18 and 20. Thus, the first and second air chambers 18 and 20 constitute respectively independent air springs, having the same effect as two air springs arranged in parallel, so that the spring constant can be changed. Also, as shown in the drawing, when the fixed piston 60 is provided with the orifice 62, the dynamic spring constant and attenuating force can be changed.

Further, in the embodiment shown in FIG. 4, when communication between the first and second air chambers 18 and 20 is shut off, the same effect as two air springs arranged in series can be obtained to change the spring constant.

Next, when the automobile travels steadily and the valve 22 is operated by the operating means 24 to afford communication between the first and second air chambers 18 and 20, a single air spring having an air chamber corresponding to the total volume of both air chambers is constituted so that the spring constant can be reduced.

(2) When elastic member is broken and vehicle height reduction is restrained:

When the elastic member 52 is broken, pressure in the first air chamber 18 is reduced. The pressure detecting means 99 detects this reduction to operate the operating means 24 through a proper control device (not shown) and shut off the valve 22. Then, since the vehicle height is maintained by the second air chamber 20, abrupt reduction of the vehicle height can be restrained.

When the valve 100 shown in FIG. 3 is used, the vehicle height reduction can be restrained by adjusting fluid pressure introduced to the connection 108 as above mentioned.

Said operation can be carried out with respect to all wheels at the same time or each wheel individually.

The effects obtained from the present invention are as follows.

Since the spring constant of the air spring can be changed the spring constant in the steady travelling is reduced to give a good ride, and the spring constant in steering, sudden start, abrupt stop or the like can be increased to improve the controllability.

Since the air chamber can be ensured even if the elastic member is broken, the vehicle height can be prevented from sudden reduction and the reduction of the controllability due to the abrupt movement of the car body can be prevented.

Since the spring constant can be increased and decreased by shutting off and affording communication between two air chambers, the shock absorber does not need to be remodelled so that the common shock absorber can be used for the same car families to reduce cost and provide simple construction.

What is claimed is:

1. An air suspension comprising:
   a shock absorber provided with a cylinder and a piston rod;
   first and second air chambers formed to surround the shock absorber, the first air chamber being formed of a first housing and a diaphragm, the second air chamber being formed of a second housing and a fixed piston which is provided with an orifice for affording communication between said first and second air chambers;
   a valve capable of affording and shutting off communication between the first and second air chambers; and
   a means for operating the valve,
   wherein said first and second air chambers act as springs arranged in parallel under the shut-off condition.

2. An air suspension comprising:
   a shock absorber provided with a cylinder and a piston rod;
   first and second air chambers formed to surround the shock absorber, the first air chamber being formed of a first housing and a diaphragm, the second air chamber being formed of a second housing and a fixed piston;
   a valve capable of affording and shutting off communication between the first and second air chambers;
   a means for operating the valve; and
   a means for detecting pressure in said first air chamber to shut off said valve when pressure in said first air chamber is reduced,
   wherein said first and second air chambers act as springs arranged in parallel under the shut-off condition.

3. An air suspension comprising:
   a shock absorber provided with a cylinder and a piston rod;
   first and second air chambers formed to surround the shock absorber, the first air chamber being formed of a housing, a diaphragm and a fixed piston, and said second air chamber being formed of said housing and fixed piston;
   a valve capable of affording and shutting off communication between the first and second air chambers; and
   a means for operating the valve,
   wherein said first and second air chambers act as springs arranged in series under the shut-off condition.

4. An air suspension as claimed in claim 3, wherein said fixed piston is provided with an orifice for affording communication between said first and second air chambers.

5. An air suspension comprising:
   a shock absorber provided with a cylinder and a piston rod;
   first and second air chambers formed to surround the shock absorber;
   a valve formed to move axially and capable of affording and shutting off communication between the first and second air chambers; and
   a means for operating the valve,
   wherein said valve is operated by a spring for biasing the valve in one direction and fluid pressure for moving the valve in the other direction, and the fluid pressure is set such that the force acting on said valve due to the fluid pressure becomes slightly larger than said spring force.

6. An air suspension comprising:
a shock absorber provided with a cylinder and a piston rod, first and second air chambers formed to surround the shock absorber and acting as parallel springs when they shut off to each other, said first air chamber being formed of a first housing fixed to said piston rod and a diaphragm fixed to said housing and cylinder and said second air chamber being formed of a second housing disposed spacedly from the inside of said first housing and a fixed piston fixed to the upper end of said cylinder;
a valve capable of affording and shutting off communication between said first and second air chambers; and
a means for operating said valve.

7. An air suspension comprising:
a shock absorber provided with a cylinder and a piston rod;
first and second air chambers formed to surround the shock absorber and acting as series springs when they shut off to each other, said first air chamber being formed of a housing fixed to said piston rod, a diaphragm fixed to said housing and cylinder and a fixed piston fixed to the upper end of said cylinder, said second air chamber being formed of said housing and fixed piston;
a valve capable of affording and shutting off communication between said first and second air chambers; and
a means for operating said valve.

* * * * *